US011200239B2

(12) United States Patent
Smart et al.

(10) Patent No.: US 11,200,239 B2
(45) Date of Patent: Dec. 14, 2021

(54) PROCESSING MULTIPLE DATA SETS TO GENERATE A MERGED LOCATION-BASED DATA SET

(71) Applicant: International Business Machines Corporation, Armonk, NY (US)

(72) Inventors: Otis Smart, Duluth, GA (US); Charles Lynn, Atlanta, GA (US); Karthik Jayaraman, Austin, TX (US); Linsong Chu, White Plains, NY (US); Ronald Bruce Baker, Austin, TX (US); Suresh Kumar Jasrasaria, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 16/857,319

(22) Filed: Apr. 24, 2020

(65) Prior Publication Data

US 2021/0334275 A1   Oct. 28, 2021

(51) Int. Cl.
*G06F 16/2455* (2019.01)
*G06F 16/29* (2019.01)
(Continued)

(52) U.S. Cl.
CPC ........ *G06F 16/2456* (2019.01); *G06F 16/211* (2019.01); *G06F 16/215* (2019.01);
(Continued)

(58) Field of Classification Search
None
See application file for complete search history.

(56) References Cited

U.S. PATENT DOCUMENTS 8,108,411 B2   1/2012   Uppala et al.
9,330,431 B2   5/2016   Huang
(Continued)

FOREIGN PATENT DOCUMENTS

WO   WO-2019048879 A1 * 3/2019 ........... G06F 16/289

OTHER PUBLICATIONS

Jie M. Zhang, et al., "Machine Learning Testing: Survey, Landscapes and Horizons", arXiv:1906.10742v2 [cs.LG], Dec. 21, 2019, 37 pages.
(Continued)

*Primary Examiner* — Robert W Beausoliel, Jr.
*Assistant Examiner* — Cheryl M Shechtman
(74) *Attorney, Agent, or Firm* — Rob Bean; Edell, Shapiro & Finnan, LLC

(57) ABSTRACT

A computer system merges location-based data sets. Each of a plurality of data sets are transformed into a standardized schema, including at least two data sets including information indicating a geographic location. The schemas of the plurality of data sets are combined by data set type to produce a resulting data set for each data set type. The schemas of a first and second data sets are joined to produce a merged data set using a machine learning model to identify corresponding rows of the schemas. The schema of the merged data set is joined with the schemas of the resulting data sets for the data set types to produce a new data set. A resulting merged data set in the standardized schema is produced. Embodiments of the present invention further include a method and program product for merging location-based data sets in substantially the same manner described above.

20 Claims, 7 Drawing Sheets

(51) Int. Cl.
*G06N 20/00* (2019.01)
*G06F 16/22* (2019.01)
*G06F 16/21* (2019.01)
*G06F 16/215* (2019.01)

(52) U.S. Cl.
CPC .......... *G06F 16/2282* (2019.01); *G06F 16/29* (2019.01); *G06N 20/00* (2019.01)

(56) References Cited

U.S. PATENT DOCUMENTS

| | | | |
|---|---|---|---|
| 10,152,323 B2 | 12/2018 | Roussel et al. | |
| 2009/0240694 A1* | 9/2009 | Jensen | G06F 16/00 |
| 2018/0060404 A1* | 3/2018 | Sun | G06F 16/211 |
| 2018/0113906 A1* | 4/2018 | Gulwani | G06F 16/24565 |
| 2019/0163679 A1* | 5/2019 | Srinivasa | G06F 16/258 |
| 2019/0325046 A1* | 10/2019 | Novik | G06F 16/213 |
| 2020/0218741 A1* | 7/2020 | Ahuja | G06N 20/00 |
| 2021/0034638 A1* | 2/2021 | Jagota | G06F 16/258 |

OTHER PUBLICATIONS

Matthew Michelson, et al., "Creating Relational Data from Unstructured and Ungrammatical Data Sources", Journal of Artificial Intelligence Research 31 (2008) 543-590, Mar. 2008, 47 pages.
Marko Kolanovic, et al., "Big Data and AI Strategies", Machine Learning and Alternative Data Approach to Investing, JP Morgan, May 2017, 280 pages.
Tessio Novack, et al., "Graph-Based Matching of Points-of-Interest from Collaborative Geo-Datasets", (2018). ISPRS International Journal of Geo-Information, 7(3), 117. doi:10.3390/ijgi7030117, Mar. 15, 2018, 17 pages.
Spiros Athanasiou, et al., "Big POI Data Integration with Linked Data Technologies", (2019). Proceedings of the 22nd International Conference on Extending Database Technology (EDBT), Mar. 26-29, 2019, http://svn.aksw.org/papers/2019/EDBT_SLIPO/public.pdf, 12 pages.
Anonymously, "Method for Related Dataset Detection, Reporting and Linking", IP.com, IPCOM000260581D, Dec. 9, 2019, 3 pages.
Anonymously, "System and Method to Predict Data Pattern and Lineage Given the System Output and the Black-Box Model", IP.com, IPCOM000258727D, Jun. 8, 2019, 5 pages.
RS. Ehrenreich, et al., "System and Method for Automatically Generating Platform-Specific Database Code from Schema Composed of Typed Tables and Formulas", IP.com, IPCOM000255833D, Oct. 16, 2018, 44 pages.

* cited by examiner

| Date | Lat & Lon | Place Name | Place Address | Polygon Coordinates | Stock Ticker | SIC Code | Sensor Measure 1 | Sensor Measure 2 | ... |
|---|---|---|---|---|---|---|---|---|---|
| 2020.03.01 | 41.077214,-104.707585 | Pop's Pizza | 123 Main Street | 41.077213,-104.707584,... | XPP | 5812 | 48°F | -50 dBm | ... |
| 2020.03.02 | 41.077012,-104.707595 | Pop's Pizza | 123 Main Street | 41.077213,-104.707584,... | XPP | 5812 | 62°F | -65 dBm | ... |
| 2020.03.03 | 41.077222,-104.707381 | Pop's Pizza | 123 Main Street | 41.077213,-104.707584,... | XPP | 5812 | 53°F | -57 dBm | ... |

FIG.3B

PROCESSING MULTIPLE DATA SETS TO GENERATE A MERGED LOCATION-BASED DATA SET

BACKGROUND

1. Technical Field

Present invention embodiments relate to merging data sets, and more specifically, to processing multiple data sets to generate a merged location-based data set.

2. Discussion of the Related Art

In the field of modern cartography, a geographic information system (GIS) refers to a framework for gathering, managing, and analyzing location-based data. Location-based data may often be combined with other data, such as user analytics and research data, to support use cases that can include, for example, identifying relevant users, selecting relevant content for users, identifying relevant locations for users, appropriately timing actions, and the like. However, conventional approaches to fusing location-based data sets with other data sets can be time-consuming and may often require manual, ad hoc interventions, as independent data sets may be obtained from disparate sources and/or may include different standards, schemas, or other inconsistencies that make merging difficult.

SUMMARY

According to one embodiment of the present invention, a computer system merges location-based data sets. Each of a plurality of data sets is transformed into a standardized schema, wherein the standardized schema includes rows and columns and the plurality of data sets include at least two data sets including information indicating a geographic location. The schemas of the plurality of data sets are combined by data set type and the rows within the combined schemas are grouped based on a combination of columns to produce a resulting data set in the standardized schema for each data set type. The schemas of first and second data sets of the plurality of data sets are joined to produce a merged data set in the standardized schema based on a machine learning model to identify rows of the schema of the second data set corresponding to rows of the schema of the first data set, wherein the merged data set in the standardized schema indicates the rows of the schema of the first data set corresponding to rows of the schema of the second data set. The schema of the merged data set is joined with the schemas of the resulting data sets for the data set types to produce a new data set in the standardized schema based on geographical distances between location-based data, wherein the new data set in the standardized schema indicates rows of the schema of the merged data set corresponding to rows of the schemas of the resulting data sets. A resulting merged data set in the standardized schema is produced by combining the corresponding rows indicated in the schemas of the merged and new data sets with the schema of the new data set. Embodiments of the present invention further include a method and program product for merging location-based data sets in substantially the same manner described above. Thus, present invention embodiments provide a universal solution for automatically processing input data sets to produce unified data sets that can be used to support a variety of user analytics and research tasks with respect to geographical locations.

Various other embodiments of the present invention will now be discussed. In some embodiments, the plurality of data sets includes one or more from a group of a company data set, a place of interest data set, a user position data set, a weather data set, a behavior data set, a psychographics data set, a demographics data set, a social media data set, and a financial data set. Thus, data that relates to a wide variety of subject matter and/or is collected by a number of different entities can nevertheless be combined into a singular related data set. In some embodiments, the first data set includes a company data set and the second data set includes a place of interest data set. These data sets can be joined to create a foundational data set that is useful for supporting the iterative merger of the remaining data sets. In some embodiments, rows of the standardized schemas of the plurality of data sets are filtered to remove missing or invalid data. Filtering out missing or invalid data reduces the size of the resulting merged data set while increasing the utility of the resulting merged data set. In some embodiments, joining the schemas of the first and second data sets further includes determining a row from the schema of the first data set with a highest matching score for each row in the schema of the second data set based on a predictive model of the machine learning model. Thus, the row of the first data set is associated with the row of the second data set that the row of the first data set is most likely to match, ensuring that the resulting merged data set forms data set associations that are relevant. In some embodiments, joining the schema of the merged data set with the schemas of the resulting data sets further includes determining locations from a resulting data set within a predefined geographical distance of a location within the merged data set, wherein rows of the schema associated with the determined locations from the resulting data set correspond to rows associated with the location of the merged data set. Thus, present invention embodiments provide a degree of fuzziness to location matching, which enables location-based data to be matched on a broader scale. In some embodiments, joining the schema of the merged data set with the schemas of the resulting data sets further includes determining a match score between the rows associated with the determined locations from the resulting data set and the rows associated with the location of the merged data set via a predictive machine learning model, and discarding the rows associated with the determined locations from the resulting data set as corresponding to the rows associated with the location of the merged data set in response to the match score failing to satisfy a threshold. Thus, a match score can be applied as a threshold to avoid associating rows of data sets that are unlikely to actually be related to each other.

BRIEF DESCRIPTION OF THE DRAWINGS

Generally, like reference numerals in the various figures are utilized to designate like components.

FIG. 3B is a diagrammatic illustration depicting a combine operation to produce a resulting merged data set in accordance with an embodiment of the present invention;

DETAILED DESCRIPTION

Figure 1:
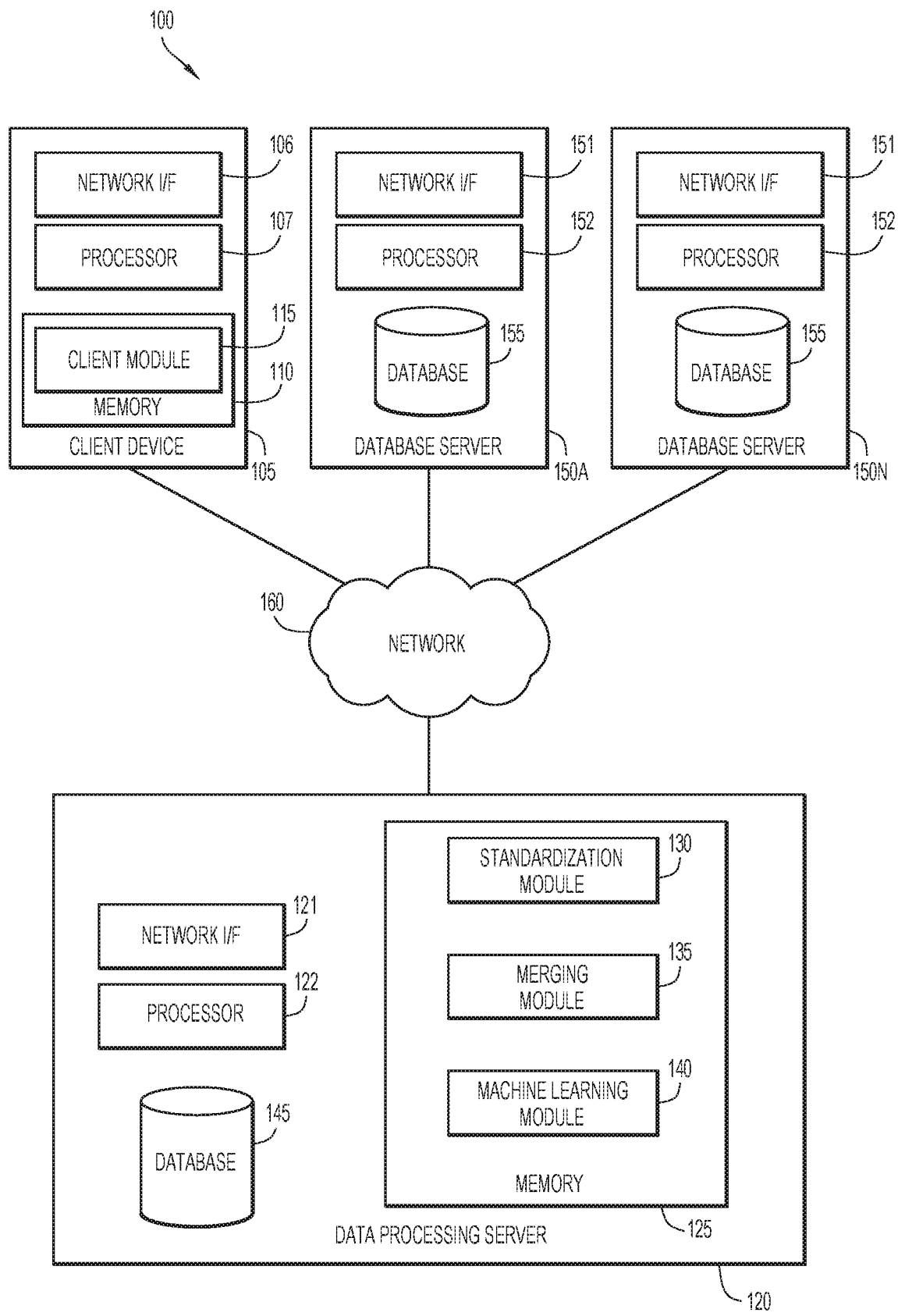
FIG. 1 is a block diagram depicting a computing environment for processing multiple data sets to generate a merged location-based data set in accordance with an embodiment of the present invention.

Present invention embodiments relate to merging data sets, and more specifically, to processing multiple data sets to generate a merged location-based data set. Location-based data in combination with other data can support a variety of applications, including user analytics, research, and other use cases. A location-based data set may include data that indicates one or more geographical locations and additional data related to each location. Location-based data sets may describe geographical locations by latitude and longitude, street address, and the like, and may further include other data related to each location. Location-based data may include data obtained from mobile devices, sensors, and the like. Location-based data can also include place of interest (PoI) data, which includes data collected about, referencing, or otherwise relating to a particular geographical location, such as an address, landmark, geographical feature, etc.

Data sets that contain location-based data may be merged with other data sets to create a unified, comprehensive data set that can support user analytics and research tasks. However, conventional approaches to merging disparate data sets involve a high degree of manual intervention, which can be costly and time-consuming. In fact, simply merging two or more PoI data sets can itself present a challenge, as same locations can be indicated in a variety of different formats. In contrast, present invention embodiments automate the merging of multiple location-based and other data sets by algorithmically collating the separate data sets into a single unified data set. Data sets may first be merged by type, and each data set type may then be merged with one or more location-based data sets. In particular, a machine learning model may be employed to identify relations between individual records so that location-based data records can be associated with other data records to create a unified data set that can support a variety of tasks. Thus, present invention embodiments provide a universal solution for automatically processing input data sets to produce unified data sets that can be used to support a variety of user analytics and research tasks with respect to geographical locations. Time-consuming manual interpretation, collation, and curation of data can be avoided entirely by fusing location-based and other data in accordance with present invention embodiments. Moreover, present invention embodiments juxtapose disparate data in a manner that supports the discovery of new relationships between entities. Present invention embodiments thus improve the fields of analytics and research by generating data sets in a fully automated manner while ensuring that the indicated relationships between data values are nevertheless trustworthy and able to support desired analytics and research applications. Moreover, joining operations are highly parallelizable and horizontally scalable, so present invention embodiments can scale with computational resources in order to quickly combine input data sets to generate a unified data set.

Various other embodiments of the present invention will now be discussed. In some embodiments, the plurality of data sets includes one or more from a group of a company data set, a place of interest data set, a user position data set, a weather data set, a behavior data set, a psychographics data set, a demographics data set, a social media data set, and a financial data set. Thus, data that relates to a wide variety of subject matter and/or is collected by a number of different entities can nevertheless be combined into a singular related data set. In some embodiments, the first data set includes a company data set and the second data set includes a place of interest data set. These data sets can be joined to create a foundational data set that is useful for supporting the iterative merger of the remaining data sets. In some embodiments, rows of the standardized schemas of the plurality of data sets are filtered to remove missing or invalid data. Filtering out missing or invalid data reduces the size of the resulting merged data set while increasing the utility of the resulting merged data set. In some embodiments, joining the schemas of the first and second data sets further includes determining a row from the schema of the first data set with a highest matching score for each row in the schema of the second data set based on a predictive model of the machine learning model. Thus, the row of the first data set is associated with the row of the second data set that the row of the first data set is most likely to match, ensuring that the resulting merged data set forms data set associations that are relevant. In some embodiments, joining the schema of the merged data set with the schemas of the resulting data sets further includes determining locations from a resulting data set within a predefined geographical distance of a location within the merged data set, wherein rows of the schema associated with the determined locations from the resulting data set correspond to rows associated with the location of the merged data set. Thus, present invention embodiments provide a degree of fuzziness to location matching, which enables location-based data to be matched on a broader scale. In some embodiments, joining the schema of the merged data set with the schemas of the resulting data sets further includes determining a match score between the rows associated with the determined locations from the resulting data set and the rows associated with the location of the merged data set via a predictive machine learning model, and discarding the rows associated with the determined locations from the resulting data set as corresponding to the rows associated with the location of the merged data set in response to the match score failing to satisfy a threshold. Thus, a match score can be applied as a threshold to avoid associating rows of data sets that are unlikely to actually be related to each other.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for processing multiple data sets to generate a merged location-based data in accordance with an embodiment of the present invention. As depicted, computing environment 100 includes a client device 105, a data processing server 120, one or more database servers 150A-150N, and a network 160. It is to be understood that the functional division among components of computing environment 100 have been chosen for purposes of explaining present invention embodiments and is not to be construed as a limiting example.

Client device 105 includes a network interface (I/F) 106, at least one processor 107, and memory 110 that includes a client application 115. Client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of client device 105 to send and receive data over a network, such as network 160. In general, client device 105 enables a user to initiate, at data processing server 120, mergers of data sets in accordance with present invention embodiments. Client device 105 may include internal and external hardware components, as depicted and described in further detail with respect to FIG. 6.

Client application 115 may include one or more modules or units to perform various functions of present invention embodiments described below. Client application 115 may be implemented by any combination of any quantity of software and/or hardware modules or units, and may reside within memory 110 of client device 105 for execution by a processor, such as processor 107.

Client application 115 may send instructions to data processing server 120 to merge two or more data sets. Client application 115 may specify data sets to be merged by indicating a location for each data set, such as database 145 of data processing server 120 and/or one or more databases 155 of database servers 150A-150N. Additionally, client application 115 may enable a user to specify options for merging data sets, such as a particular standardized schema for a resulting merged data sets, a particular machine learning model to utilize for identifying corresponding rows of data sets, and the like.

Client application 115 may enable a user of client device 105 to access data sets that have been produced as a result of merging two or more data sets in accordance with present invention embodiments. Client application 115 may access data processing server 120 in order to retrieve information corresponding to merged data sets. In particular, client application 115 may download an entire data set, may obtain specified rows and/or columns of a data set, and/or may instruct data processing server 120 to apply conventional or other database query operations on data sets produced by data processing server 120.

Data processing server 120 includes a network interface (I/F) 121, at least one processor 122, and memory 125. Memory 125 may include a standardization module 130, a merging module 135, and a machine learning module 140. Data processing server 120 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 121 enables components of data processing server 120 to send and receive data over a network, such as network 160. In general, data processing server 120 and its modules process multiple data sets to produce merged location-based data sets. Input data sets may be obtained from database 145 and/or from one or more of databases 155 of database servers 150A-150N. Data processing server 120 may include internal and external hardware components, as depicted and described in further detail with respect to FIG. 6.

Standardization module 130, merging module 135, and machine learning module 140 may include one or more modules or units to perform various functions of present invention embodiments described below. Standardization module 130, merging module 135, and machine learning module 140 may be implemented by any combination of any quantity of software and/or hardware modules or units, and may reside within memory 125 of data processing server 120 for execution by a processor, such as processor 122.

Standardization module 130 may apply operations to transform data sets, as necessary, to ensure that each data set conforms to a consistent data schema. Standardization module 130 may initially transform a data set into a data frame, which is a two-dimensional tabular arrangement of data values. The data frame may include conceptual tuples of an input data set as columns, and rows that contain values corresponding to the values for the values of each record in the input data set. Thus, an input data set that does not conform to a tabular arrangement but instead uses tuples, comma-separated values, etc., to store the values for each record, is transformed into a tabular data frame.

Standardization module 130 may perform additional standardization operations on a data frame. In some embodiments, standardization module 130 renames column names to designated or predetermined column names. For example, "GPS," "coords," "lat/long," etc., may all be renamed to "location." In some embodiments, standardization module 130 converts values from one type to another to ensure that all values are of a consistent type. Value types may include string, decimal, integer, Boolean, array, structure, dictionary, timestamp, date, and the like. For example, a data set's integer values may be converted to float (e.g., "3" becomes "3.000"). In some embodiments, missing values are replaced with a uniform indicator such as "NULL."

In some embodiments, string values are revised to a uniform nomenclature. In particular, punctuation and/or symbols can be replaced, common company suffixes (i.e. designations of incorporation) may be removed or abbreviated, and hyphenated words may be separated. In some embodiments, lemmatization is performed; words may be lemmatized in a consistent manner according to a library such as the Natural Language Toolkit (NLTK). In some embodiments, portions of addresses or numbers may be removed, such as country codes or area codes for telephone numbers or country abbreviations for postal addresses.

In some embodiments, text may be updated to full addresses. Reverse geocoding operations may be applied to convert point locations to readable addresses or place names.

In particular, curated geo-polygonal shapefiles or other geospatial vector data, such as those used in GIS software, may be utilized for reverse geocoding.

In some embodiments, standardization module 130 appends any missing essential columns to a data frame, and populates such added columns with "NULL" values. Standardization module 130 may add a dataset type column that has a title such as "source" and whose values indicate the data set type. Data set types can include PoI, user position, weather, behavior, psychographics, demographics, social media, financial, and the like. Standardization module 130 may rearrange columns of a data frame into a particular order so that each data frame of a same data type will share a same ordering of columns (e.g., first a source column, then an ID column, then a latitude column, then a longitude column, etc.). Thus, standardization module 130 outputs data sets such that all data sets of a same data set type share a same schema (i.e. a particular arrangement of columns by column type).

Standardization module 130 may filter data sets by identifying and discarding bad rows according to certain criteria. For example, if latitude, longitude, and/or timestamp columns have a "NULL" value, then that record may be removed by discarding the row of values. In general, the criteria for discarding a row can include a value of a row exceeding a predefined range of acceptable values for that column. Thus, standardization module 130 will remove rows that contain data that is erroneous or likely to be erroneous.

Merging module 135 merges data sets according to a process including steps where: data sets of the same data set type are merged, different data sets are merged iteratively using a machine learning model to identify matches between rows in different data sets, and data sets of different types are merged based on matching rows and a resulting merged data set is output in a standardized schema.

A first subprocess of merging module 135 merges data sets of the same data set type. Merging module 135 may perform row-wise concatenation to merge each data set of a given type (e.g., PoI, user position, weather, behavior, psychographics, demographics, social media, financial, etc.). For example, merging module 135 may merge two PoI data sets into a first merged data set, may merge three user position data sets into a second merged data set, and may merge two financial data sets into a third merged data set. The final output of the first subprocess of merging module 135 is a single uniform data set per data set type (e.g., one user position data set, one weather data set, etc.)

Merging module 135 may also remove duplicate entries when merging data sets by data set type. Data of each data set may be grouped according to distinct combinations of the values in the ID and timestamp columns, and a single value can be computed for each remaining column that represents that column. The representative value for a given column may be determined according to a column-specific operation, and may be computed or otherwise selected based on any of: the first value in a group, an average value (e.g., mean, median, mode, etc.), a distance function that returns the value in a group that differs the least from the other values (e.g., using a string distance metric such as Damerau-Levenshtein, Jaro-Winkler, Sorensen-Dice, or others, and including tie-breaker criteria if needed), and/or using conventional or other hashing techniques. Thus, when merging module 135 identifies a match between the combination of ID, timestamp, and other representative values of two data sets, one may be discarded if it is a duplicate. In some embodiments, merging module 135 de-duplicates PoI data sets by using address columns instead of ID columns, as different PoI sources may have different ID values that reference the same actual location. Similarly, merging module 135 may de-duplicate financial data sets (e.g., data sets that include stock ticker data) by seeking matches among distinct combinations of the values in the ticker column, brand column, and timestamp column.

A second subprocess of merging module 135 sequentially joins the merged data sets of different data set types. In some embodiments, a financial (e.g., ticker-brand) data set and a PoI data set are first merged to generate a foundational data set, and each additional data set is iteratively merged until all of the data sets have been integrated into a single data set. In some embodiments, if a group of data sets lacks a financial data set, then the PoI data set may be used as the foundational data set. If the group of data sets lacks a PoI data set, another data set of a different data set type may be selected and joined with the financial data set if both have joinable columns (e.g., tick, brand, timestamp), or the other data set may be used alone as the foundational data set. The final output of the second subprocess is a new data set with the same columns as the foundational data set and additionally, for each joined data set, a new related column that contains a list or array of matches between each row of the foundational data set and selected rows of the joined data set. Thus, the merged data set indicates how rows of the schemas of different data sets correspond to each other. These indicated relationships are used to populate a resulting merged data set with values from the various other data sets merged by data set type.

When merging module 135 sequentially joins the merged data sets, the initial join operation may include one stage per each row of the foundational data set. Merging module 135 may utilize a machine learning model to identify matches between rows of different data sets. A machine learning model may calculate a match score value to indicate the likelihood of rows matching. For example, a one-element list containing financial data (e.g., ticker and brand pairs with time-series values for share prices) may be matched with a location having the highest match score value (e.g., to the brand) as determined by the machine learning model. Thus, when the data sets are merged, financial data for a business will be linked to a physical location of that business.

After the initial join operation, merging module 135 iteratively joins the schema of the foundational data set with the schemas of the other data sets of each data set type. Merging module 135 may calculate a list of locations, such as latitude and longitude pairs, and fuse together data sets by associating data that falls within a predefined geographical distance (e.g., fifty feet, thirty meters, one mile, etc.). For example, rows of data that are associated with same locations, or locations that fall within a certain proximity of each other, may be associated. In some embodiments, a circle or radius may be extended from each pair of coordinates, and matching locations may be identified when circles intersect by a minimum threshold amount (e.g., when circles are tangent, when circles overlap by a percentage amount of area, when one circle falls within another, etc.). When merging module 135 completes the iterative join operation, a new column of the merged data set includes values that associate corresponding rows of the multiple data sets.

In some embodiments, when merging module 135 iteratively joins data sets, compared rows whose match score does not exceed a predetermined threshold may not initially be included in a join operation. However, a second stage of the iterative join operation may nonetheless merge data sets using data other than coordinate pairs to identify matches.

When a merged data set and a next data set both include equivalent columns that contain data other than coordinate pairs, the data may be introduced into a machine learning model so that machine learning and/or predictive model analysis can identify additional matches.

Upon completion of the iterative join operation, a third subprocess of merging module 135 transforms the resulting merged data set (e.g., the output of the second subprocess) so that each list of matches in each column is joined to become separate rows and columns. Thus, the resulting merged data set is populated with data values to result in a complete combined data set.

Machine learning module 140 may develop one or more machine learning models and apply machine learning models in order to identify matches between data sets. Since there may not be any uniform nomenclature for string values (e.g., brand names, company names, business sector descriptions, etc.) in place across data sets, approaches such as fuzzy matching may be required in order to join data sets. Thus, machine learning module 140 may include a predictive model that returns match scores for rows of compared data sets.

A predictive model may include a load stage for loading sample data, an enhance stage for preparing variables, an extract stage to derive new variables, a reduce stage to select a subset of variables, and an estimate stage that utilizes pattern classification to quantify a matching level of two compared rows. An evaluate stage may validate predictions, and a save stage can save a model for future use. The predictive model of machine learning module 140 will be described in further detail below with respect to FIG. 5.

Database 145 may include any non-volatile storage media known in the art. For example, database 145 can be implemented with a tape library, optical library, one or more independent hard disk drives, or multiple hard disk drives in a redundant array of independent disks (RAID). Similarly, data in database 145 may conform to any suitable storage architecture known in the art, such as a file, a relational database, an object-oriented database, and/or one or more tables. In some embodiments, database 145 may store data related to merging data sets, including input data sets, resulting merged data sets, machine learning model data, and the like.

Database servers 150A-150N each include a network interface (I/F) 151, at least one processor 152, and a database 155. Each database server 150A-150N may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 151 enables components of database servers 150A-150N to send and receive data over a network, such as network 160. In general, database servers 150A-150N store data sets that are used as input to generate merged location-based data sets in accordance with present invention embodiments. Each database server 150A-150N may include internal and external hardware components, as depicted and described in further detail with respect to FIG. 6.

Database 155 of each database server 150A-150N may include any non-volatile storage media known in the art. For example, database 155 can be implemented with a tape library, optical library, one or more independent hard disk drives, or multiple hard disk drives in a redundant array of independent disks (RAID). Similarly, data in database 155 may conform to any suitable storage architecture known in the art, such as a file, a relational database, an object-oriented database, and/or one or more tables. In some embodiments, database 155 may store one or more input data sets, such as PoI data sets, user position data sets, weather data sets, behavior data sets, psychographics data sets, demographics data sets, social media data sets, and/or financial data sets. Database servers 150A-150N may execute database queries in order to identify and transmit requested data to data processing server 120.

Network 160 may include a local area network (LAN), a wide area network (WAN) such as the Internet, or a combination of the two, and includes wired, wireless, or fiber optic connections. In general, network 160 can be any combination of connections and protocols known in the art that will support communications between client device 105, data processing server 120, and/or database servers 150A-150N via their respective network interfaces in accordance with embodiments of the present invention.

Figure 2:
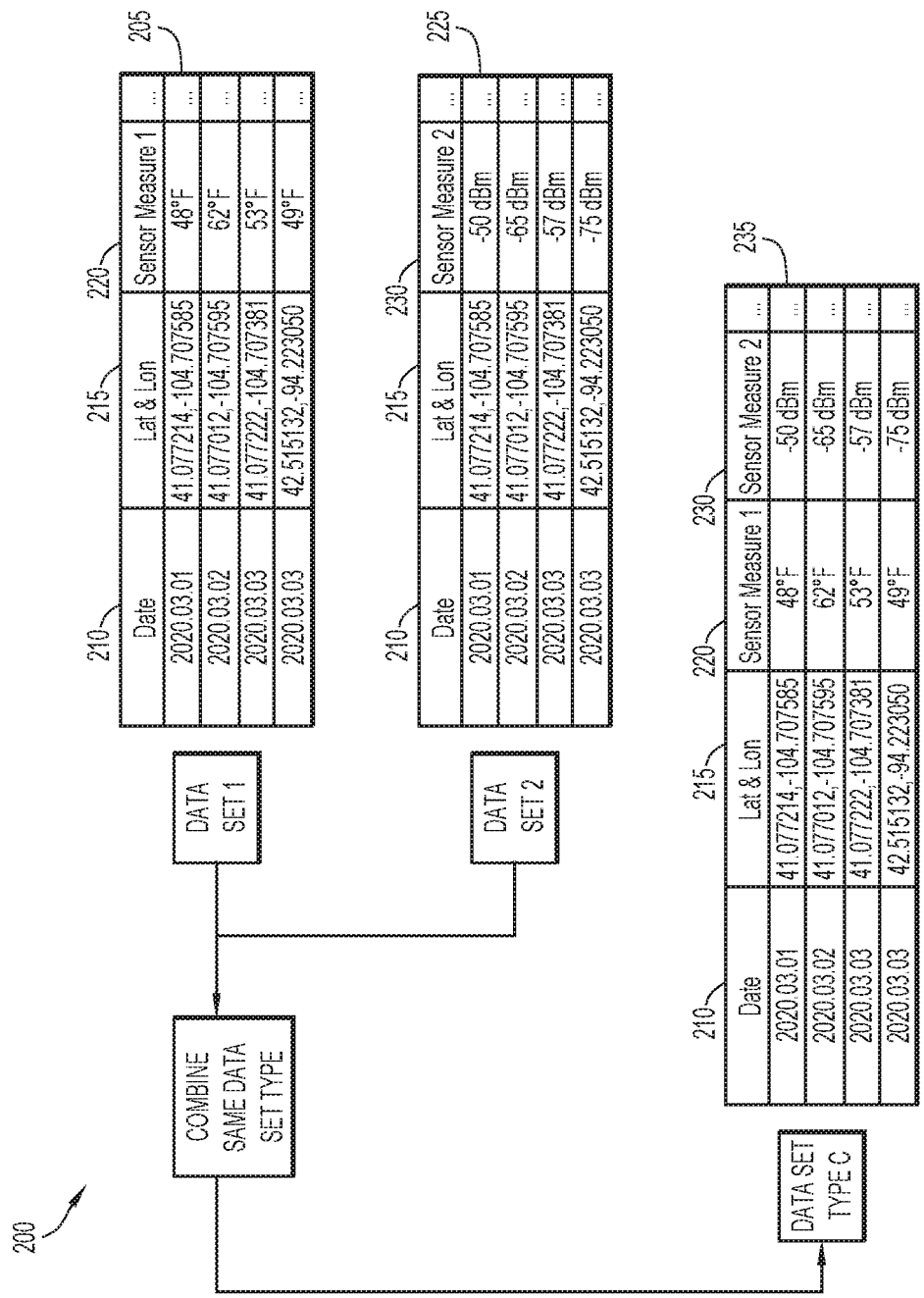
FIG. 2 is a diagrammatic illustration depicting a join operation by data set type in accordance with an embodiment of the present invention.

FIG. 2 depicts a join operation 200 by data set type in accordance with an embodiment of the present invention. Join operation 200 includes two data sets 205 and 225 ("data set 1" and "data set 2," respectively) as input data sets, and data set 235 ("data set type C") as an output data set. Input data sets 205 and 225 are both a same type of data set, and have been processed by standardization module 130 in accordance with present invention embodiments. While only two data sets are included in the depicted example of join operation 200, it should be appreciated that join operation 200 can join any number of data sets as long as they all conform to a same data set type.

Merging module 135 may combine data sets 205 and 225 by performing separate union operations to concatenate the data sets in a row-wise manner. In particular, a row of data set 205 may be joined via a union operation with a row of data set 225 based on a matching date value of column 210 and/or location value of column 215. Thus, each row of data set 230 will include the values of column 220 ("sensor measure 1") from data set 205 and values of column 230 ("sensor measure 2") from data set 225.

Figure 3A:
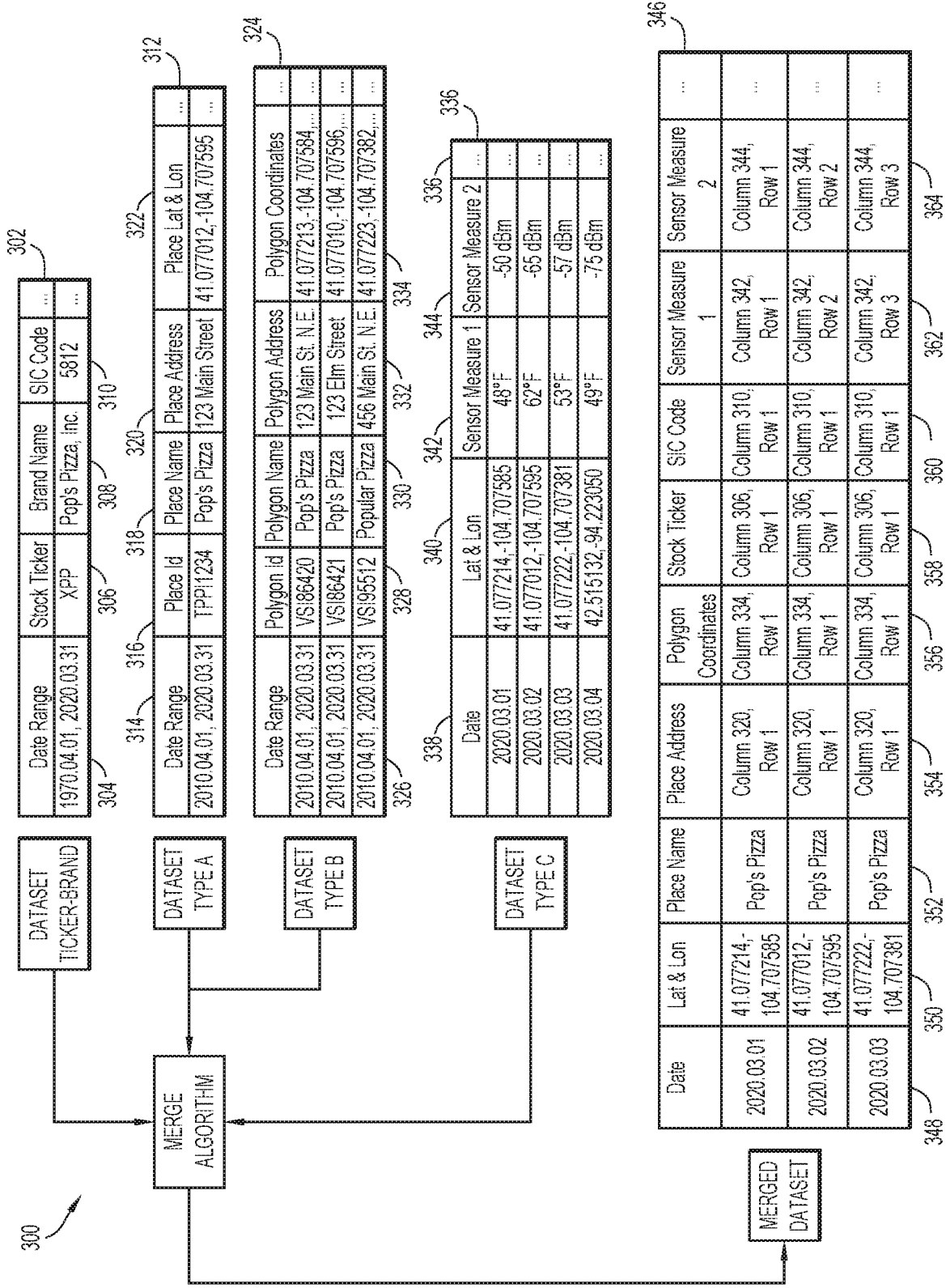
FIG. 3A is a diagrammatic illustrations depicting an iterative join operation to produce a new data set in accordance with an embodiment of the present invention.

FIG. 3A depicts an iterative join operation 300 to produce a new data set in accordance with an embodiment of the present invention. Iterative join operation 300 includes merged data sets 302, 312, 324, and 336, each of which is a different data set type. In particular, data set 302 is a ticker-brand data set, data set 312 is another data set type ("data set type A"), data set 324 is another data set type ("data set type B"), and data set 336 is another data set type ("data set type C"). Each data set 302, 312, 324, and 336 may be generated by merging two or more data sets of that data set type.

Merging module 135 iteratively merges the data sets 302, 312, 324, and 336. For example, data set 302 may first be merged with data set 312 to generate a foundational data set; in a next iteration, the foundational data set is merged with data set 324, and the resulting data set is then merged with data set 336 in yet another iteration.

Merging module 135 may utilize a machine learning model to identify matching rows in order to merge data sets. A predictive model of machine learning module 140 calculates a match score for compared rows of different data sets, and identifies rows that should be combined when the match score surpasses a threshold value. For example, the predictive model may use the brand name column 308 of data set 302 and the place name column 318 of data set 312 to identify row matches. Similarly, the predictive model may use the polygon name column 330 and/or polygon address column 332 of data set 324 and the place name column 318 and/or place address column 320 of data set 312 to identify row matches.

Other rows of data sets may be joined when the indicated geographical values for the rows fall within a predetermined distance. For example, the geographical location indicated in the first row of column 340 of data set 336 is within a threshold distance of the geographical location indicated in column 322 of data set 312, so those rows may be merged.

The resulting new data set 346 may thus include rows that indicate corresponding rows in the schemas of other data sets. For example, column 354 maps to column 320 of data set 312, column 356 maps to column 334 of data set 324, column 358 maps to column 306 of data set 302, column 360 maps to column 310 of data set 302, and columns 362 and 364 map to columns 342 and 344 of data set 336.

FIG. 3B depicts an combine operation 375 to produce a resulting merged data set 366. As depicted, data set 366 is populated with values from the referenced data sets instead of indicating the values. For example, column 354 includes the place address data values from column 320, column 358 includes the stock ticker data values from column 306, and the like. Thus, data set 366 is a complete, independent data set that contains data joined by location and indicates relationships between the data values of the various input data sets.

Figure 4:
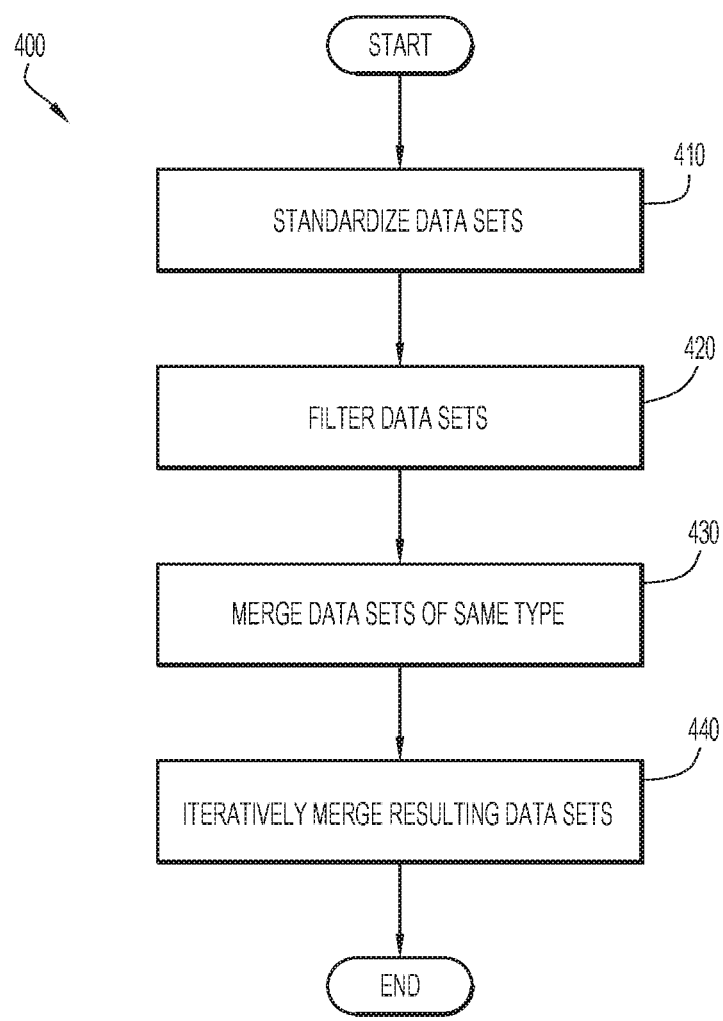
FIG. 4 is a flow chart depicting a method of processing multiple data sets to generate a merged location-based data set in accordance with an embodiment of the present invention.

FIG. 4 is a flow chart depicting a method 400 of processing multiple data sets to generate a merged location-based data set in accordance with an embodiment of the present invention.

Data sets are standardized at operation 410. Standardization module 130 may transform data sets into tabular data frames that include rows of values and columns having standardized names, may replace missing values with consistent NULL indicators, may convert values to an appropriate data type (e.g., string, float, integer, etc.), and may perform other standardization operations such as lemmatization, removing suffixes, prefixes, articles (e.g., "the"), and the like. Columns may be reordered as necessary to ensure that all data sets of a same data type have a same ordering of columns.

Data sets are filtered at operation 420. Standardization module 130 may additionally filter data sets to remove any erroneous or likely erroneous records. A row may be removed when one or more of its values falls outside of an acceptable range. For example, an acceptable temperature range for a meteorological station may span from −200° C. to 200° C., as it is more likely that a temperature value falling outside of that range is due to an equipment error.

Data sets of the same type are merged at operation 430. Merging module 135 combines all data sets of a same data set type in order to produce one data set per data set type. The schemas for each data set of a given data set type may be combined by performing a row-wise concatenation of data sets, which are then processed to remove any duplicate records.

The data sets resulting from merge operation 430 are themselves iteratively merged at operation 440. A foundational data set may be generated by merging a ticker-brand data set with a PoI data set; however, if one or more of these data set types are not included in the input data sets, other data sets may be selected to serve as substitutes. The foundational data set may include columns of its component data sets. A machine learning model may then be employed to calculate match scores between rows of the foundational data set and rows of each additional data set that was output via merge operation 430. Additionally, matches between data sets may be determined based on geographical proximity. Merging module 135 may calculate a list of locations, such as latitude and longitude pairs, and fuse together data sets by associating rows whose geographical locations are within a predefined geographical distance of each other. Thus, rows of data that are associated with locations that fall within a certain proximity of each other may be linked.

Merging module 135 proceeds to iteratively merge additional data sets into the data set resulting from the last iteration until all of the data sets are merged on the basis of match scores determined by a machine learning model and/or geographical distances between indicated location data. When the data sets are merged, the new data set includes a new column for each constituent data set that includes a list or other indication of matches between rows of the data sets. Merging module 135 then produces a resulting merged data set in the standardized schema by combining the rows that are associated with each other in the schemas of the merged and new data sets into the schema of the new data set, thus creating a resulting merged data set that includes rows populated with values that are correctly associated with each other rather than references of matches between other data sets. The final output of merging module 135 includes a complete, combined data set that contains rows of values that are related to each other due to a commonality of location and/or due to other relationships identified by the machine learning model.

Figure 5:
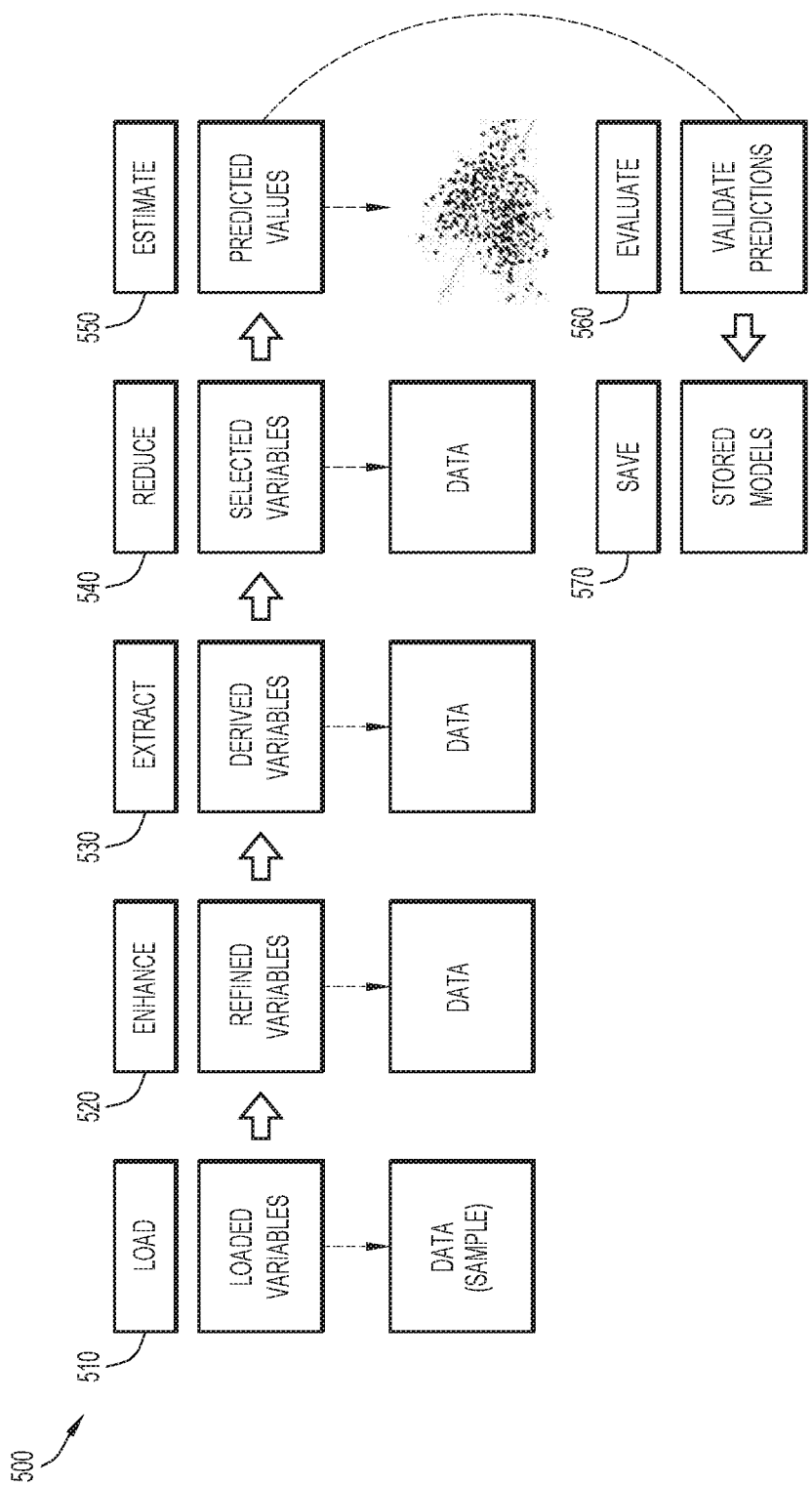
FIG. 5 is a flow diagram of a machine learning model in accordance with an embodiment of the present invention.

FIG. 5 depicts a machine learning model 500 in accordance with an embodiment of the present invention. Machine learning model 500 may include a predictive model that can compute match scores between rows based on the column names and the data values of the rows.

A load stage loads or imports data for subsequent processing at operation 510. Sample data that contains common columns (e.g., company name, brand name, sector name, sector code, industry name, industry code, etc.) is imported. The sample data includes two or more data set samples having different data set types, and is labeled with a match status to indicate whether pairs of rows of the two or more data sets match or not.

An enhance stage prepares the data for training a predictive model at operation 520. Values may be converted to lower case and to ensure a uniform encoding format, such as 8-Bit Unicode Transformation Format (UTF-8). Rows and/or columns may be removed if they contain bad values (e.g., values that fall outside of an acceptable range), missing values may be filled with indicators such as "NULL," and the like.

An extract stage computes new variables using current variables at operation 530. The current variables may include any of the data values indicated in columns of the input data sets. In particular, counterpart columns of the two or more input data sets may be paired using one or more algorithmic approaches. Examples of approaches to comparing columns may include, for example, a cosine similarity, a string-edit distance metric (such as Damerau-Levenshtein, Jaro-Winkler, Sorensen-Dice, and the like), a multiple word-count and/or word-ratio metrics (such as a minimum and maximum number of words, a number or ratio of matching words, a number or ratio of consecutively matching words, and the like), a multiple character-count and/or character-ratio metrics (such as a minimum and maximum number of characters, a number or ratio of matching characters, a number or ratio of consecutively matching characters, and the like), a trinary number indicating the presence or absence of a particular word such as "bank" in none, one, or both of the columnar values, and the like. The extract stage thus computes values that measure the similarity of values of the compared columns of the two or more input data sets.

The reduce stage utilizes a dimensionality reduction algorithm to select a set of variables for pattern identification at operation 540. Dimensionality reduction may be performed by, for example, sequential forward/backward selection, principal component analysis, kernel principal component analysis, particle swarm optimization, evolutionary algorithms, and the like. Thus, the reduce stage selects a subset of variables with minimum cardinality and minimum redundancy to ensure computation efficiency during the pattern learning of the estimate stage.

An estimate stage converts elements of feature vectors to single values using a machine learning or other algorithm at operation 550. The estimate stage applies a pattern classification algorithm, which may include, for example, a decision tree algorithm, a random forest algorithm, a support vector machine model, a naive Bayes classifier, a nearest neighbors algorithm, a neural network, and/or combinations thereof. The pattern classification algorithm learns associations between match statuses (match or no match) between rows based on the selected variables in the rows. In some embodiments, the pattern classification algorithm learns associations between match statuses using two random row-wise sub-samples: a first sub-sample to estimate the predictor, and a second sub-sample to quantify the predictor's performance.

An evaluate stage uses inferential and/or descriptive statistics to quantify the machine learning model's prediction performance at operation 560. This process may be iterated multiple times, with predictor performance being recorded each iteration to identify an optimal predictor (e.g., the result with the highest performance among all records).

A save stage stores the predictive model and its evaluation results to a file system for future use at operation 570. The save stage stores the predictor selected as the optimal predictor along with information such as an importance score of each of the predictor's sub-variables or features, performance statistics, and the like. Stored models may then be used to compute match scores in accordance with present invention embodiments.

Figure 6:
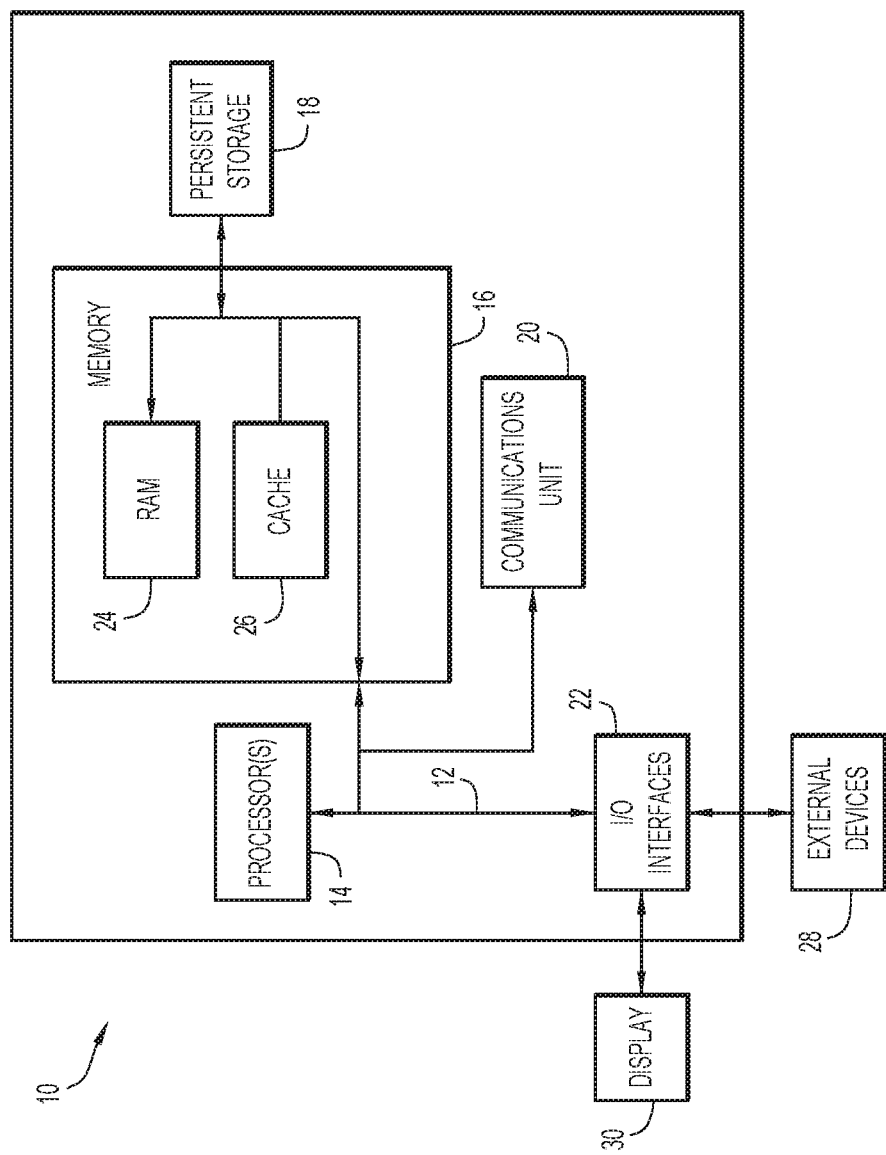
FIG. 6 is a block diagram depicting a computing device in accordance with an embodiment of the present invention.

FIG. 6 is a block diagram depicting components of a computer 10 suitable for executing the methods disclosed herein. Computer 10 may implement client device 105, data processing server 120, and/or database server 150A-150N in accordance with embodiments of the present invention. It should be appreciated that FIG. 6 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to merging location-based data sets (e.g., input data sets, machine learning models and training data, merged data sets, data set metadata, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105, data processing server 120, and/or database server 150A-150N may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to merging location-based data sets (e.g., input data sets, machine learning models and training data, merged data sets, data set metadata, etc.) may include any information provided to, or generated by, client device 105, data processing server 120, and/or database server 150A-150N. Data relating to merging location-based data sets may include any desired format and arrangement, and may include any quantity of any types of fields of any size to store any desired data. The data relating to merging location-based data sets may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to merging location-based data sets), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of processing multiple data sets to generate a merged location-based data set.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, client application 115, standardization module 130, merging module 135, machine learning module 140, etc.). These systems may include any types of monitors and input devices (e.g., keyboard, mouse, voice recognition, etc.) to enter and/or view information.

It is to be understood that the software (e.g., communications software, server software, client application 115, standardization module 130, merging module 135, machine learning module 140, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, client application 115, standardization module 130, merging module 135, machine learning module 140, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to merging location-based data sets). The database system may be implemented by any number of any conventional or other databases, data stores or storage structures (e.g., files, databases, data structures, data or other repositories, etc.) to store information (e.g., data relating to merging location-based data sets). The database system may be included within or coupled to the server and/or client systems. The database systems and/or storage structures may be remote from or local to the computer or other processing systems, and may store any desired data (e.g., data relating to merging location-based data sets).

The present invention embodiments may employ any number of any type of user interface (e.g., Graphical User Interface (GUI), command-line, prompt, etc.) for obtaining or providing information (e.g., data relating to merging location-based data sets), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, processing various sets of data in any format or standard to produce a uniform standardized data set that indicates relations between data and geographical locations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of merging location-based data sets comprising:
   transforming, via a processor, each of a plurality of data sets into a standardized schema, wherein the standardized schema includes rows and columns and the plurality of data sets include at least two data sets including information indicating a geographic location;
   combining, via the processor, the schemas of the plurality of data sets by data set type and grouping the rows within the combined schemas based on a combination of columns to produce a resulting data set in the standardized schema for each data set type;
   joining, via the processor, the schemas of first and second data sets of the plurality of data sets to produce a merged data set in the standardized schema based on a machine learning model to identify rows of the schema of the second data set corresponding to rows of the schema of the first data set, wherein the merged data set in the standardized schema indicates the rows of the schema of the first data set corresponding to rows of the schema of the second data set;
   joining, via the processor, the schema of the merged data set with the schemas of the resulting data sets for the data set types to produce a new data set in the standardized schema based on geographical distances between location-based data, wherein the new data set in the standardized schema indicates rows of the schema of the merged data set corresponding to rows of the schemas of the resulting data sets; and
   producing, via the processor, a resulting merged data set in the standardized schema by combining the corresponding rows indicated in the schemas of the merged and new data sets with the schema of the new data set.

2. The computer-implemented method of claim 1, wherein the plurality of data sets includes one or more from a group of a company data set, a place of interest data set, a user position data set, a weather data set, a behavior data set, a psychographics data set, a demographics data set, a social media data set, and a financial data set.

3. The computer-implemented method of claim 1, wherein the first data set includes a company data set and the second data set includes a place of interest data set.

4. The computer-implemented method of claim 3, wherein joining the schemas of the first and second data sets further comprises:
   determining a row from the schema of the first data set with a highest matching score for each row in the schema of the second data set based on a predictive model of the machine learning model.

5. The computer-implemented method of claim 1, further comprising:
   filtering rows of the standardized schemas of the plurality of data sets to remove missing or invalid data.

6. The computer-implemented method of claim 1, wherein joining the schema of the merged data set with the schemas of the resulting data sets further comprises:
   determining locations from a resulting data set within a predefined geographical distance of a location within the merged data set, wherein rows of the schema associated with the determined locations from the resulting data set correspond to rows associated with the location of the merged data set.

7. The computer-implemented method of claim 6, wherein joining the schema of the merged data set with the schemas of the resulting data sets further comprises:
   determining a match score between the rows associated with the determined locations from the resulting data set and the rows associated with the location of the merged data set via a predictive machine learning model; and
   discarding the rows associated with the determined locations from the resulting data set as corresponding to the rows associated with the location of the merged data set in response to the match score failing to satisfy a threshold.

8. A computer system for merging location-based data sets, the computer system comprising:
   one or more computer processors;
   one or more computer readable storage media;
   program instructions stored on the one or more computer readable storage media for execution by at least one of the one or more computer processors, the program instructions comprising instructions to:
   transform each of a plurality of data sets into a standardized schema, wherein the standardized schema includes rows and columns and the plurality of data sets include at least two data sets including information indicating a geographic location;
   combine the schemas of the plurality of data sets by data set type and grouping the rows within the combined schemas based on a combination of columns to produce a resulting data set in the standardized schema for each data set type;
   join the schemas of first and second data sets of the plurality of data sets to produce a merged data set in the standardized schema based on a machine learning model to identify rows of the schema of the second data set corresponding to rows of the schema of the first data set, wherein the merged data set in the standardized schema indicates the rows of the schema of the first data set corresponding to rows of the schema of the second data set;

join the schema of the merged data set with the schemas of the resulting data sets for the data set types to produce a new data set in the standardized schema based on geographical distances between location-based data, wherein the new data set in the standardized schema indicates rows of the schema of the merged data set corresponding to rows of the schemas of the resulting data sets; and produce a resulting merged data set in the standardized schema by combining the corresponding rows indicated in the schemas of the merged and new data sets with the schema of the new data set.

9. The computer system of claim 8, wherein the plurality of data sets includes one or more from a group of a company data set, a place of interest data set, a user position data set, a weather data set, a behavior data set, a psychographics data set, a demographics data set, a social media data set, and a financial data set.

10. The computer system of claim 8, wherein the first data set includes a company data set and the second data set includes a place of interest data set.

11. The computer system of claim 10, wherein the instructions to join the schemas of the first and second data sets further comprise instructions to:

determine a row from the schema of the first data set with a highest matching score for each row in the schema of the second data set based on a predictive model of the machine learning model.

12. The computer system of claim 8, wherein the program instructions further comprise instructions to:

filter rows of the standardized schemas of the plurality of data sets to remove missing or invalid data.

13. The computer system of claim 8, wherein the instructions to join the schema of the merged data set with the schemas of the resulting data sets further comprise instructions to:

determine locations from a resulting data set within a predefined geographical distance of a location within the merged data set, wherein rows of the schema associated with the determined locations from the resulting data set correspond to rows associated with the location of the merged data set.

14. The computer system of claim 13, wherein the instructions to join the schema of the merged data set with the schemas of the resulting data sets further comprise instructions to:

determine a match score between the rows associated with the determined locations from the resulting data set and the rows associated with the location of the merged data set via a predictive machine learning model; and discard the rows associated with the determined locations from the resulting data set as corresponding to the rows associated with the location of the merged data set in response to the match score failing to satisfy a threshold.

15. A computer program product for merging location-based data sets, the computer program product comprising one or more computer readable storage media collectively having program instructions embodied therewith, the program instructions executable by a computer to cause the computer to:

transform each of a plurality of data sets into a standardized schema, wherein the standardized schema includes rows and columns and the plurality of data sets include at least two data sets including information indicating a geographic location;

combine the schemas of the plurality of data sets by data set type and grouping the rows within the combined schemas based on a combination of columns to produce a resulting data set in the standardized schema for each data set type;

join the schemas of first and second data sets of the plurality of data sets to produce a merged data set in the standardized schema based on a machine learning model to identify rows of the schema of the second data set corresponding to rows of the schema of the first data set, wherein the merged data set in the standardized schema indicates the rows of the schema of the first data set corresponding to rows of the schema of the second data set;

join the schema of the merged data set with the schemas of the resulting data sets for the data set types to produce a new data set in the standardized schema based on geographical distances between location-based data, wherein the new data set in the standardized schema indicates rows of the schema of the merged data set corresponding to rows of the schemas of the resulting data sets; and produce a resulting merged data set in the standardized schema by combining the corresponding rows indicated in the schemas of the merged and new data sets with the schema of the new data set.

16. The computer program product of claim 15, wherein the plurality of data sets includes one or more from a group of a company data set, a place of interest data set, a user position data set, a weather data set, a behavior data set, a psychographics data set, a demographics data set, a social media data set, and a financial data set.

17. The computer program product of claim 15, wherein the first data set includes a company data set and the second data set includes a place of interest data set.

18. The computer program product of claim 17, wherein the instructions to join the schemas of the first and second data sets further cause the computer to:

determine a row from the schema of the first data set with a highest matching score for each row in the schema of the second data set based on a predictive model of the machine learning model.

19. The computer program product of claim 15, wherein the program instructions further cause the computer to:

filter rows of the standardized schemas of the plurality of data sets to remove missing or invalid data.

20. The computer program product of claim 15, wherein the instructions to join the schema of the merged data set with the schemas of the resulting data sets further cause the computer to:

determine locations from a resulting data set within a predefined geographical distance of a location within the merged data set, wherein rows of the schema associated with the determined locations from the resulting data set correspond to rows associated with the location of the merged data set.

* * * * *